US008867136B2

(12) United States Patent
Hashikawa (10) Patent No.: US 8,867,136 B2
(45) Date of Patent: Oct. 21, 2014

(54) FLOATING IMAGE DISPLAY DEVICE (75) Inventor: Hirokazu Hashikawa, Kofu (JP)

(73) Assignee: Pioneer Corporation, Kawasaki-Shi (JP)

(*) Notice: Subject to any disclaimer, the term of this patent is extended or adjusted under 35 U.S.C. 154(b) by 461 days.

(21) Appl. No.: 12/991,832

(22) PCT Filed: Apr. 28, 2009

(86) PCT No.: PCT/JP2009/058390
§ 371 (c)(1),
(2), (4) Date: Apr. 7, 2011

(87) PCT Pub. No.: WO2009/136578
PCT Pub. Date: Nov. 12, 2009

(65) Prior Publication Data
US 2011/0181949 A1 Jul. 28, 2011

(30) Foreign Application Priority Data
May 9, 2008 (JP) ................. 2008-123156

(51) Int. Cl.
*G02B 27/10* (2006.01)
*G03B 21/28* (2006.01)
*G02B 17/00* (2006.01)
*G02B 27/22* (2006.01)
*H04N 13/04* (2006.01)

(52) U.S. Cl.
CPC .......... *G02B 17/006* (2013.01); *G02B 27/2292* (2013.01); *H04N 13/0443* (2013.01)
USPC ................ 359/627; 359/459; 353/10; 353/99

(58) Field of Classification Search
USPC ................ 359/471, 478, 479, 612, 459, 627; 362/346, 507; 353/10, 98, 99
See application file for complete search history.

(56) References Cited

U.S. PATENT DOCUMENTS

| 4,741,595 | A | | 5/1988 | Onoda et al. |
| 4,853,769 | A | * | 8/1989 | Kollin ............................. 348/54 |

(Continued)

FOREIGN PATENT DOCUMENTS

| JP | 58-021702 | 2/1983 |
| JP | 61-025104 | 2/1986 |

(Continued)

OTHER PUBLICATIONS

Japanese Office Acton dated Jul. 10, 2012, issued in corresponding Japanese Application No. 2010-511059 with English translation.

(Continued)

*Primary Examiner* — Audrey Y Chang
(74) *Attorney, Agent, or Firm* — Nixon & Vanderhye PC (57) ABSTRACT

A floating image display device includes an object, and a light reflecting optical member for reflecting displayed light from the object to a viewer. The light reflecting optical member comprises a structure in which micro mirror units each having first and second light reflecting sides are arranged in matrix. The light reflecting optical member reflects the displayed light by the first and second light reflecting sides at two times to form a mirror image. The light reflecting optical member comprises a first assembly and a second assembly. Each of the first and second assemblies is constructed by arranging a plurality of longitudinal members each having one light reflecting side such that all of the light reflecting sides are oriented in a same direction. The first assembly and the second assembly are laminated onto each other with the light reflecting sides of the first assembly and the light reflecting surfaces of the second assembly intersecting with each other. The light reflecting sides of the first assembly constitute the first light reflecting sides of the respective micro mirror units, and the light reflecting sides of the second assembly constitute the second light reflecting sides of the respective micro mirror units.

14 Claims, 7 Drawing Sheets

(56) References Cited

U.S. PATENT DOCUMENTS

| | | | | |
|---|---|---|---|---|
| 5,757,564 | A | * | 5/1998 | Cross et al. ............. 359/870 |
| 6,042,235 | A | * | 3/2000 | Machtig et al. ............ 353/28 |
| 6,100,771 | A | | 8/2000 | Komiya |
| 7,083,292 | B2 | * | 8/2006 | Takemoto ............. 359/613 |
| 7,287,881 | B2 | * | 10/2007 | Hibi et al. ............. 362/346 |
| 7,345,815 | B2 | * | 3/2008 | Shimizu et al. ........... 359/388 |
| 7,703,969 | B2 | * | 4/2010 | Miyashita ............. 362/607 |
| 8,057,043 | B2 | * | 11/2011 | Maekawa ............. 353/10 |

FOREIGN PATENT DOCUMENTS

| | | |
|---|---|---|
| JP | 63-184701 | 7/1988 |
| JP | 63-191182 | 8/1988 |
| JP | 09-005503 | 1/1997 |
| JP | 11-296158 | 10/1999 |
| WO | WO 2006/061959 | 6/2006 |
| WO | WO 2009/131128 | 10/2009 |

OTHER PUBLICATIONS

International Search Report for PCT/JP2009/058390, mailed Aug. 11, 2009.

Satoshi Maekawa, "Floating Image Display Viewable from Multiple Viewing Points Using Dihedral Corner Reflector", Journal of Three Dimensional Images, vol. 21, No. 4, Dec. 15, 2007, pp. 29-32, with English Translation—13 pages.

Maekawa at al., "Advances in Passive Imaging Elements with Micromirror Array", Proceedings of SPIE, vol. 6803, Jan. 28-30, 2008, pp. 68030B-1 to 68030B-11.

Press Release: "Successful development of a 'Mirror' to form 3-D Floating Images—toward Construction of Real 3-D Floating Images—", Nov. 24, 2006, http://www2.nict.go.jp/pub/whatsnew/press/h18/061124-2/061124-2.html, with English Translation—2 pages.

* cited by examiner

FLOATING IMAGE DISPLAY DEVICE

This application is the U.S. national phase of International Application No. PCT/JP2009/058390 filed 28 Apr. 2009 which designated the U.S. and claims priority to Japanese Application no. 2008-123156, filed 9 May 2008, the entire contents of each of which are hereby incorporated by reference.

TECHNICAL FIELD OF THE INVENTION

The present invention relates to floating image display devices for displaying images in space.

BACKGROUND ART

For implementing real three-dimensional floating images, a passive optics has been developed using nanofabrication technologies that finely divide a light beam; this passive optics allows a mirror image to be formed as a real image in space (see the nonpatent document 1 described later).

Many fine openings are formed through the substrate of the optics. Each of the fine openings is 100×100×100 μm. Two adjacent interior surfaces of each opening serve as a micromirror. That is, two adjacent interior surfaces of each opening are used as a dihedral corner reflector. Light passes through each opening while being reflected by the micromirror at two times so that a mirror image is formed.

PRIOR ART DOCUMENT

Non-Patent Document

Non-patent document 1: Successful Development of a "Mirror" to Form 3-D Floating Images—toward the construction of real 3-D Floating Images—: [Retrieval Date: Apr. 28, 2008], Internet <URL:http://www2.nict.go.jp/pub/whatsnew/press/h18/061124-2/0611 24-2.html>

DISCLOSURE OF THE INVENTION

Problems to be Solved by the Invention

However, because fine fabrication technologies are required to form the optics, floating image display devices using such optics may increase their manufacturing cost.

The problem set forth above is an example of problems to be solved by the present invention. A purpose of the present invention is to provide floating image display devices capable of displaying floating images at low cost.

Means for Solving the Problems

A floating image display device according to one aspect of the present invention includes an object, and a light reflecting optical member for reflecting displayed light from the object to a viewer. The light reflecting optical member comprises a structure in which micro mirror units each having first and second light reflecting sides are arranged in matrix. The light reflecting optical member reflects the displayed light by the first and second light reflecting sides at two times to form a mirror image. The light reflecting optical member includes a first assembly and a second assembly. Each of the first and second assemblies is constructed by arranging a plurality of longitudinal members each having one light reflecting side such that all of the light reflecting sides are oriented in a same direction. The first assembly and the second assembly are laminated onto each other with the light reflecting surfaces of the first assembly and the light reflecting surfaces of the second assembly intersecting with each other. The light reflecting sides of the first assembly constitute the first light reflecting sides of the respective micro mirror units, and the light reflecting sides of the second assembly constitute the second light reflecting sides of the respective micro mirror units.

Embodiment for Carrying Out the Invention

In the floating image display device according to claim 1, a light reflecting optical member configured such that micro mirror units each having first and second light reflecting sides are arranged in matrix is provided. The light reflecting optical member includes a first assembly and a second assembly. Each of the first and second assemblies is constructed by arranging a plurality of longitudinal members each having one light reflecting side such that all of the light reflecting sides are oriented in a same direction. The first assembly and the second assembly are laminated onto each other with the light reflecting surfaces of the first assembly and the light reflecting surfaces of the second assembly intersecting with each other. The light reflecting sides of the first assembly constitute the first light reflecting sides of the respective micro mirror units, and the light reflecting sides of the second assembly constitute the second light reflecting sides of the respective micro mirror units. The displayed light is reflected by the first and second light reflecting sides at two times to form a mirror image. Thus, no fine fabrication technologies with high cost are required to produce the light reflecting optical member, it is possible to display floating images as real images with low cost.

EXAMPLES

Examples of the present invention will be described hereinafter with reference to the drawings.

Figure 1:
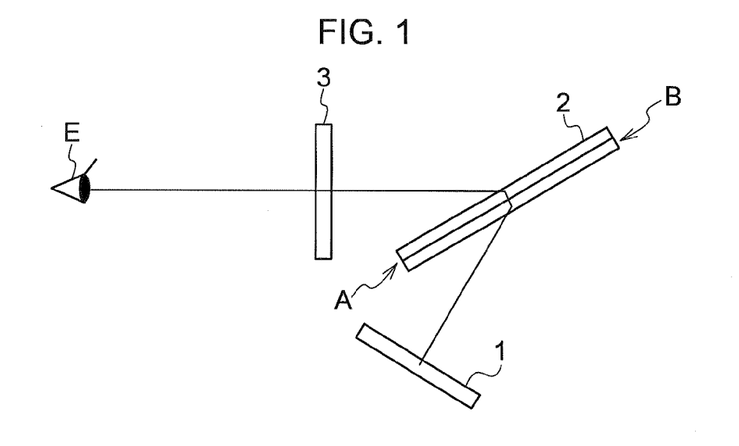
FIG. 1 is an optical system diagram illustrating an example of the present invention.

FIG. 1 illustrates the optical system of a floating image display device to which an invention according to claim 1 is applied. The floating image display device is comprised of a display section 1 as an object, and a mirror 2 as a light reflective element. The display section 1 displays images according to video signals supplied from a video supplier (not shown). The mirror 2 reflects an image displayed by the display section 1 to an eye E (view position) of a viewer to visually provide the viewer a real image in space.

The mirror 2, as illustrated in FIG. 1, has a plate-like shape, and is arranged obliquely with respect to a view direction of the viewer's eye E. One side of the mirror 2 is oriented toward the display section 1, and the other side thereof is oriented toward the view position of the viewer.

In the arrangement of the display section 1 and the mirror 2 illustrated in FIG. 1, a screen of the display section 1 is so disposed below a slightly view position side (slightly front side) of the mirror 2 as to be oblique with respect to the mirror 2. A linear line perpendicular to the screen and extending to the mirror 2 and a linear line in the view direction intersect with each other substantially at the center of the mirror 2. The mirror 2 is disposed at an angular position that bisects the angle between the two linear lines.

Figure 2:
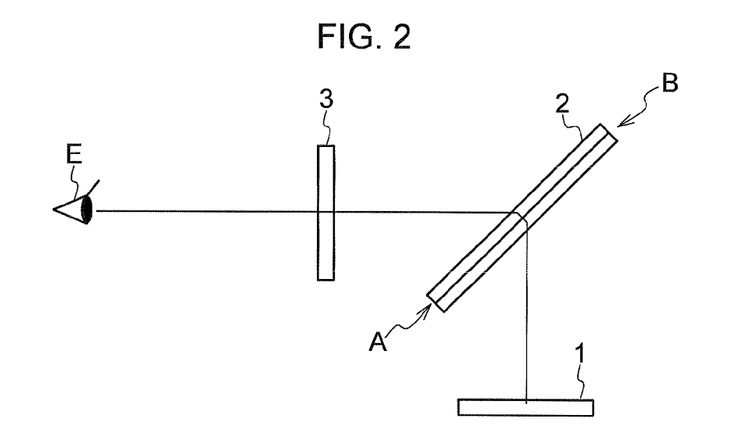
FIG. 2 is an optical system diagram illustrating another arrangement of a mirror and a display section of a floating image display device illustrated in FIG. 1.
Figure 3:
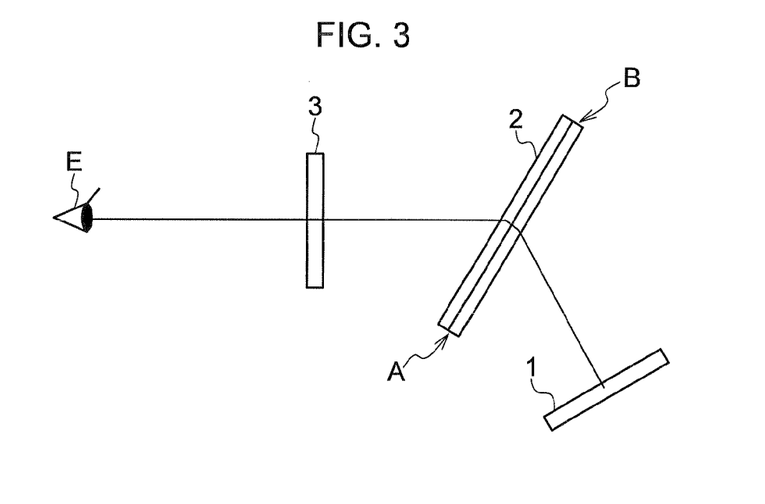
FIG. 3 is an optical system diagram illustrating a further arrangement of a mirror and a display section of a floating image display device illustrated in FIG. 1.

As illustrated in FIG. 2, the display section 1 and the mirror 2 can be arranged such that the screen of the display section 1 is located horizontally, and a vertical line from the screen up to the mirror 2 and the linear line in the view direction intersect with each other at the mirror 2 at a right angle. In addition, as illustrated in FIG. 3, the screen of the display section 1 can be so disposed below a slightly back side of the mirror as to be oblique with respect to the mirror 2.

Figure 4:
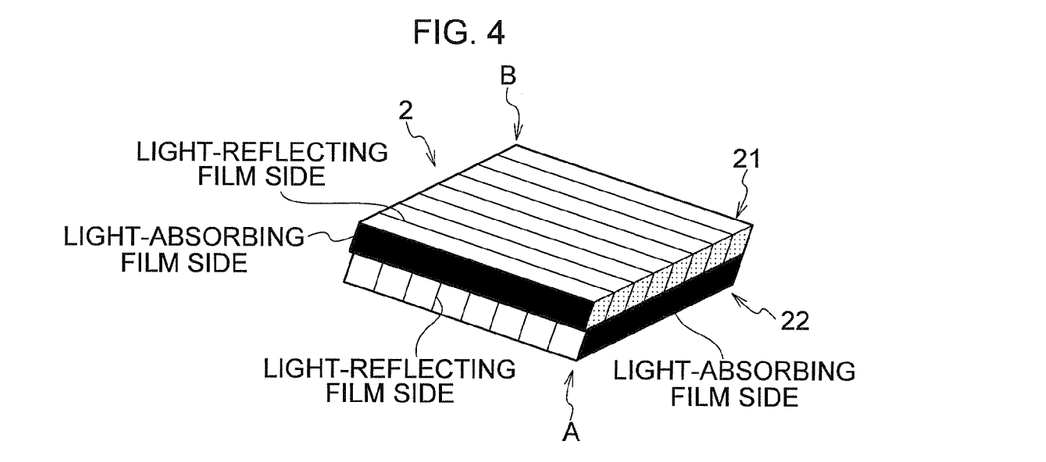
FIG. 4 is a view illustrating the mirror of the floating image display device illustrated in FIG. 1.

The mirror 2, as illustrated in FIG. 4, includes two sheet portions (first and second assemblies) 21 and 22. Each of the sheet portions 21 and 22 is formed by parallely arranging a number of rectangular parallelepiped members 20 with the rectangular parallelepiped members 20 being in contact with one another. Both ends A and B of the mirror 2 illustrated in FIGS. 1 to 3 correspond to diagonal angles A and B of the mirror 2 illustrated in FIG. 4. The end A is regarded as a lower end, and the end B as an upper end.

Each of the rectangular parallelepiped members 20 is a longitudinal member, and has a rectangular cross section in its lateral direction perpendicular to its longitudinal direction; one side of the rectangular cross section has a length within a range from several hundred micrometers to several centimeters or thereabout. Each of the rectangular parallelepiped members 20 consists of a transparent rod made of glass or plastic as represented by acrylic, the length of which can be determined depending on images to be projected, and for example is set to be within a range from tens of millimeters to several meters. Three of four sides of each rectangular parallelepiped member 20 extending in its longitudinal direction are smoothed because they are used for light transmission or light reflection. The number of the rectangular parallelepiped members 20 for each of the sheet portions 21 and 22 is determined to be within a range from one hundred to two million or thereabout.

Figure 5:
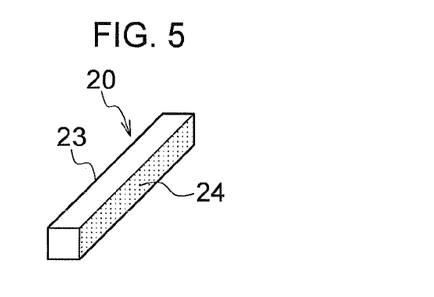
FIG. 5 is a view illustrating a rectangular parallelepiped member that configures the mirror.

A light reflecting film 23, as illustrated in FIG. 5, is formed on one side of each rectangular parallelepiped member 20 extending in its longitudinal direction. The light reflecting film 23 is formed by, for example, vapor deposition or sputtering of aluminum or silver. On the side of each rectangular parallelepiped member 20, which is opposite to the light reflecting film formed side, a light absorbing film 24 is preferably formed to serve as a light absorbing side. The light absorbing film 24 can be formed using a matte black paint, or by bringing a black thin sheet into intimate contact with the side of each rectangular parallelepiped member 20, which is opposite to the light reflecting film formed side.

Figure 6:
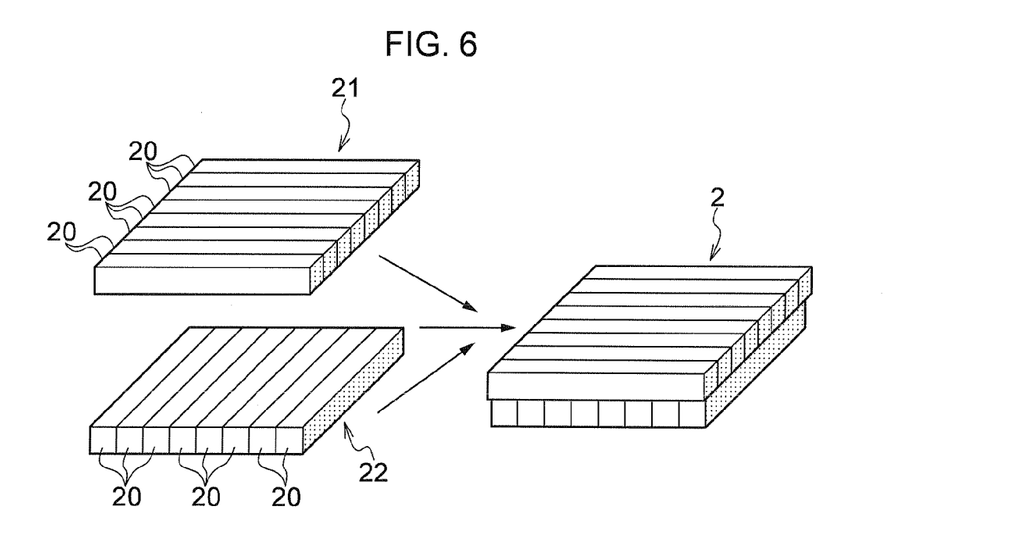
FIG. 6 is a view illustrating the combination of two sheet portions that form the mirror.

Each of the sheet portions 21 and 22 is formed by placing the rectangular parallelepiped members 20 together such that the light-absorbing film side of each rectangular parallelepiped member 20 is in intimate contact with the light reflecting film side of an adjacent rectangular parallelepiped member 20. The sheet portions 21 and 22, as illustrate in FIG. 6, are laminated onto each other with their aligned directions of the rectangular parallelepiped members 20 intersecting with each other at an angle of 90 degrees so that the mirror 2 is produced. An intersection of each of the rectangular parallelepiped members 20 of the sheet portion 21 and a corresponding one of the rectangular parallelepiped members 20 of the sheet portion 22 configures a fine mirror unit. The light reflecting film side of the sheet portion 21 of each fine mirror unit serves as a first light reflecting side of a first assembly, and the light reflecting film side of the sheet portion 22 serves as a second light reflecting side of a second assembly.

Note that, because each of the sheet portions 21 and 22 is formed by bringing the light-absorbing film side of one rectangular parallelepiped member 20 into intimate contact with the light reflecting film side of another rectangular parallelepiped member 20, the light absorbing film 24 can be laminated on the light reflecting film 23.

Figure 7:
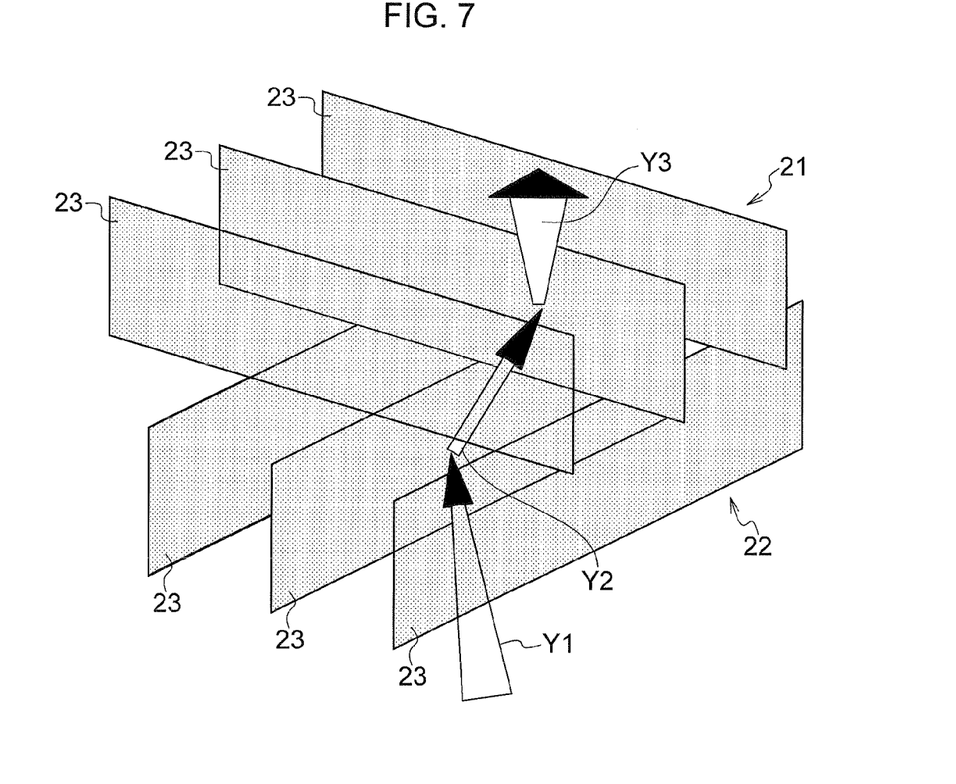
FIG. 7 is a view illustrating two reflections of displayed light by the mirror.

With this configuration of the floating image display device, an image displayed on the screen of the display section 1 is reflected by each light reflecting film side of the mirror 2 so as to be formed on a viewer's line of sight as a floating image 3. Specifically, as illustrated in FIG. 7, displayed light left from the display section 1 in the direction shown by the arrow Y1 is reflected by the light reflecting film side 23 of the sheet portion 22, the reflected displayed light in the direction shown by the arrow Y2 is reflected by the light reflecting film side 23 of the sheet portion 21, and the reflected displayed light goes toward the viewer in the direction shown by the arrow Y3. That is, the two light-reflections allow a mirror image to be formed.

Because no fine fabrication technologies with high cost are required to produce the mirror 2, it is possible to display floating images in space with low cost.

Figure 8:
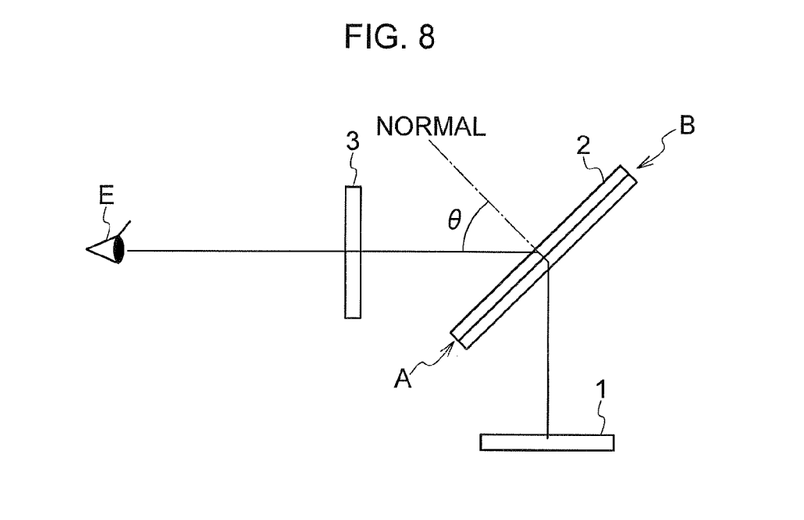
FIG. 8 is a view illustrating an angle of a view direction with respect to the normal to the mirror for obtaining the thickness of each sheet portion.

As illustrated in FIG. 8, when an angle of the view direction with respect to the normal to the mirror 2 is represented as θ, the interval of each pair of parallel mirrors (light reflecting film sides) formed in each of the sheet portions 21 and 22, that is, the lateral width of each rectangular parallelepiped member 20 is represented as W, each rectangular parallelepiped member 20 has an index represented as n, and the thickness of each sheet portion, that is, the length of each rectangular parallelepiped member 20 in the laminating direction of the mirror 2 is represented as D, the thickness D is expressed by the following equation:

$$D = \sqrt{2W \cdot \cos(X)/\sin(X)} \qquad (1)$$

where $\sin(X) = \sin(\theta)/n$

The reference character X is a tilt angle of the axis of light beams with respect to the normal in the mirror 2.

Setting the angle θ, interval W, and index n to 60 degrees, 1 mm, and 1.5, respectively, permits the thickness D to be approximately 2.0 mm.

Setting the angle θ, interval W, and index n to 45 degrees, 1 mm, and 1.5, respectively, permits the thickness D to be approximately 2.7 mm.

Setting the angle θ, interval W, and index n to 30 degrees, 1 mm, and 1.5, respectively, permits the thickness D to be approximately 4.0 mm.

Because each rectangular parallelepiped member 20 is made of glass, plastic resin, or the like, it has an index of approximately 1.5. This may cause surface reflection. Thus, applying a reduced-reflection coating to each of the side of the mirror 2 facing the object (display section 1) and the side thereof facing the real image 3 allows the real image to be formed with its sharpness being increased.

The first embodiment shows the configuration in which each rectangular parallelepiped member 20 is formed as a transparent layer made of glass, acrylic resin, or the like, serving as a longitudinal member constituting the mirror 2. In place of the configuration, using a large number of very thin mirror sheets can achieve the same effects, whose configuration consists of two layers of parallel mirrors; these two layers are perpendicular to each other, and whose layout can be calculated using a light index n=1.

Using glass, acrylic resin, epoxy resin, UV curable resin, or the like as each rectangular parallelepiped member 20 of the mirror 2 may cause surface reflection because of a significant difference in index between the mirror 2 and air. Thus, applying a reduced-reflection evaporated coating to the surface of the mirror 2 allows high-quality floating images with reduced surface reflection to be formed. In place of the reduced-reflection evaporated coating, anti-reflection film or a reduced reflection film can be applied to the surface of the mirror 2.

Parts of light, each of which has been reflected by the mirror 2 at once, has an optical axis in a normal direction of the mirror 2. In order to avoid such once-reflected rays of light, the display section 1 as the object can be placed at a position that allows the range of the rays of once-reflected light to be nonoverlapped with the range of floating images to be viewed. This measure allows no rays of once-reflected light to be viewed, maintaining the qualities of images at high levels.

The light reflecting film 23 of each rectangular parallelepiped member 20 of the mirror 2 is formed with an aluminum/silver evaporated film, an aluminum/silver spattered film, or a metal reflection film made of, for example, silver, but can be formed with a light reflecting film made of materials except for metals. As the light reflecting film made of materials except for metals, a resin film with a significantly different index can be used to be layered, or a dielectric film can be used to be formed; these films can obtain the same reflection. In reflection using a difference in index, a high-index glass or resin to be used as the core of optical fibers is used as the material of each rectangular parallelepiped member 20, and a low-index glass or resin to be used as the outer layer (cladding layer) of optical fibers is used in place of metals.

At that time, the material to be layered is optical glass or resin, so that all components of the mirror sheet can be constructed with materials having identical physical characteristics. Thus, mechanical strength distributions can be uniform in each side, and the deterioration of the reflection performance can be inhibited. At the same time, this method is effective for improvement of the parallelism among the reflection surfaces because it contributes to the uniformity of their adhered (joined) portions.

A metal corrosion protection layer can be laminated on the light reflecting film formed with an aluminum/silver evaporated film, an aluminum/silver spattered film, or a metal reflection film made of, for example, silver; this metal corrosion protection layer can restrict the deterioration of reflectance ratio. As the metal corrosion protection layer, a chrome evaporated layer, a black-chromium plated layer, a nickel-chromium plated layer, a zinc (black chromate) plated layer, a black-alumite blackened layer, or a copper blackened layer can be formed. Because many of these layers are black or dark blue in color, they can serve as light absorbing layers.

Figure 9:
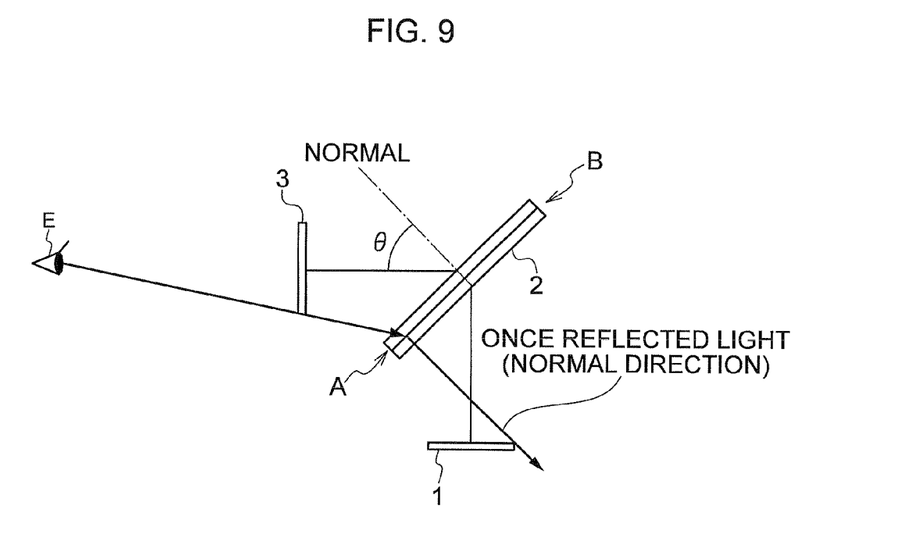
FIG. 9 is a view illustrating the relationship between the display section and the mirror 2 in arrangement.

FIG. 9 illustrates the optical system of a floating image display device as another example of the present invention. The floating image display device illustrated in FIG. 9 includes the display section 1 and the mirror 2 as well as the floating image display device illustrated in FIG. 2 so that identical reference numerals are assigned to their identical components. The floating image display device illustrated in FIG. 10 further includes a display section 4 and a half mirror 5. The display section 4 displays images according to video signals supplied from a video supplier (not shown); these images to be displayed by the display section 4 are different from images displayed by the display section 1. The video signals indicative of backgrounds are supplied from a background image supplier (not shown) to the display section 1, and the video signals indicative of foregrounds are supplied from a foreground image supplier (not shown) to the display section 4.

Figure 10:
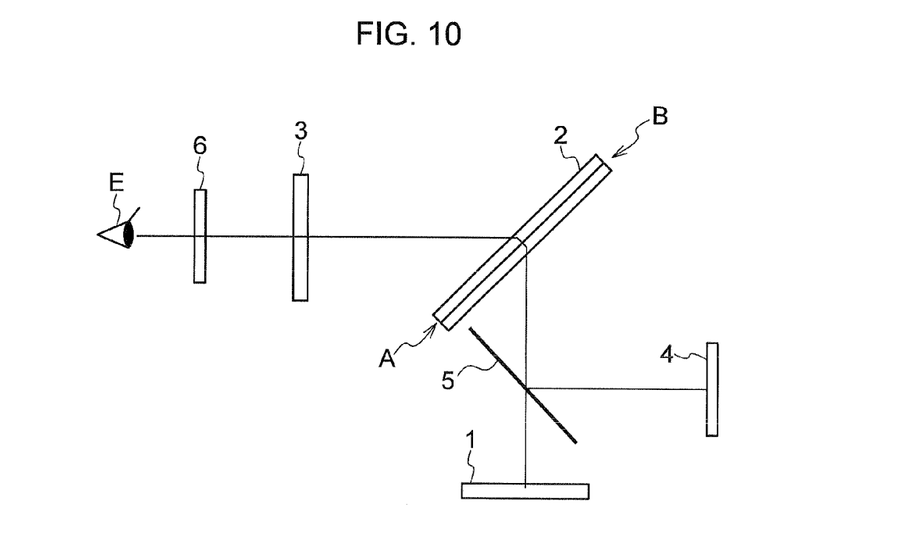
FIG. 10 is an optical system diagram illustrating another example of the present invention.

The half mirror 5 is disposed between the display section 1 and the mirror 2. The half mirror 5 causes an image displayed by the display section 1 to pass therethrough, and reflects an image displayed by the display section 4 to the mirror 2. An optical axis from the display section 1 up to the mirror 2 is in alignment with an optical axis from the half mirror 5 up to the mirror 2. The distance of an optical path from the display section 4 up to the mirror 2 is longer than that of an optical path from the display section 1 up to the mirror 2.

With this configuration of the floating image display device illustrated in FIG. 10, an image displayed on the screen of the display section 1 passes through the half mirror 5 and reaches the mirror 2. The image reaching the mirror 2 is reflected by each light reflecting film side of the mirror 2 so as to be formed on a viewer's line of sight as a floating image 3. At the same time, an image displayed on the screen of the display section 4 is reflected by the half mirror 5 so as to reach the mirror 2. The image reaching the mirror 2 is reflected by each light reflecting film side of the mirror 2 so as to be formed on a viewer's line of sight as another floating image 6. Specifically, this permits a plurality of floating images to be projected simultaneously, making it possible for the viewer to visibly recognize the plurality of floating images.

When a plasma display is used as each of the display sections 1 and 4 of the floating image display device illustrated in FIG. 10, a neutral density filter, which is usually attached to the surface of normal plasma displays, can be removed. This is because the half mirror 5 equivalently serves as the neutral density filter. Removing the neutral density filter from the plasma display allows the amount of light obtained by the screen of the plasma display to be approximately tripled so that the brightness of real images to be finally projected are tripled, making it possible to further improve virtual reality.

In addition, the background image supplier is connected to the display section 1, and the foreground image supplier is connected to the display section 4. Using two-dimensional images standardized by Japanese Electronics and Information Technology Industries Association (JEITA) and depth maps matched with the two-dimensional images allows foreground/background video signals to be easily taken out from the two-dimensional images.

Figure 11:
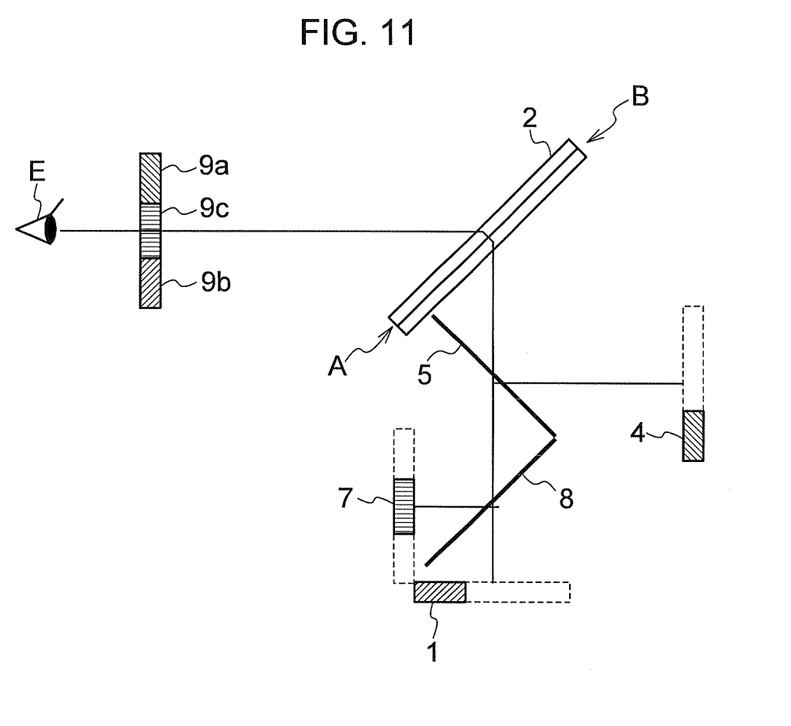
FIG. 11 is an optical system diagram illustrating a further example of the present invention.

FIG. 11 illustrates the optical system of a floating image display device as a further example of the present invention. The floating image display device illustrated in FIG. 11 includes a display section 7 and a half mirror 8 in addition to the configuration of the floating image display device illustrated in FIG. 10. An image to be displayed by the display section 7 is different from an image to be displayed by the display section 1 and that to be displayed by the display section 4, but is a part of one and the same image. That is, one image is divided into the top portion, the middle portion, and the bottom portion. The bottom portion of one image is displayed by the display section 1, the top portion of the one image is displayed by the display section 4, and the middle portion thereof is displayed by the display section 7.

The half mirror 8 is disposed between the display section 1 and the half mirror 5. The half mirror 8 causes an image displayed by the display section 1 to pass therethrough to the half mirror 5, and reflects an image displayed by the display section 7 to the half mirror 5. An optical axis from the display section 1 up to the mirror 2 is in alignment with an optical axis from the half mirror 8 up to the half mirror 5. Other configurations are the same as those of the device illustrated in FIG. 10. Note that the distances of optical paths from the individual display sections 1, 4, and 7 up to the mirror 2 are equal to each other.

With this configuration of the floating image display device illustrated in FIG. 11, an image displayed on the screen of the display section 1 passes through the half mirrors 8 and 5 and reaches the mirror 2. The image reaching the mirror 2 is reflected by each light reflecting film side of the mirror 2 so as to be formed on a viewer's line of sight as a top real image 9a. At the same time, an image displayed on the screen of the display section 4 is reflected by the half mirror 5 so as to reach the mirror 2. The image reaching the mirror 2 is reflected by each light reflecting film side of the mirror 2 so as to be formed on a viewer's line of sight as a bottom real image 9b. An image displayed on the screen of the display section 7 is reflected by the half mirror 8, passes through the half mirror 5, and reaches the mirror 2. The image reaching the mirror 2 is reflected by each light reflecting film side of the mirror 2 so as to be formed on a viewer's line of sight as a middle real image 9c. These real images 9a to 9c are so formed at the same position on the viewer's lines of sight as to be combined as a single floating image. This allows the viewer to view large-sized floating images as a large-sized display.

For example, using 72 display sections each of which has the screen is 1 meter by 2 meters allows large floating images each of which is approximately 12 meters by 12 meters to be obtained.

The floating image display device illustrated in FIG. 11 can have the layout that the display sections 1, 4, and 7 are arranged without being contacted to each other in order to obtain one seamless image. Note that solid lines of each of the display sections 1, 4, and 7 in FIG. 11 represent an object portion to be displayed, and dashed lines thereof represent another portion corresponding to the size of floating images to be viewed by the viewer; these dashed lines can not be required.

Note that using a glass mirror as each rectangular parallelepiped member causes, in cutting it, the cut sections to be tilted or the surface to have small roughness, which becomes a major factor that causes combined images to be blurred. For addressing it, coating low-viscosity epoxy resin or UV curable resin on the surface allows the surface of the mirror to be smoothed, resulting in clear real images with little off-axis. Coating on either side of the mirror is most effective, and in addition to that, coating on the laminated sides of two sheet portions can form an adjective layer between the two sheet portions.

Figure 12:
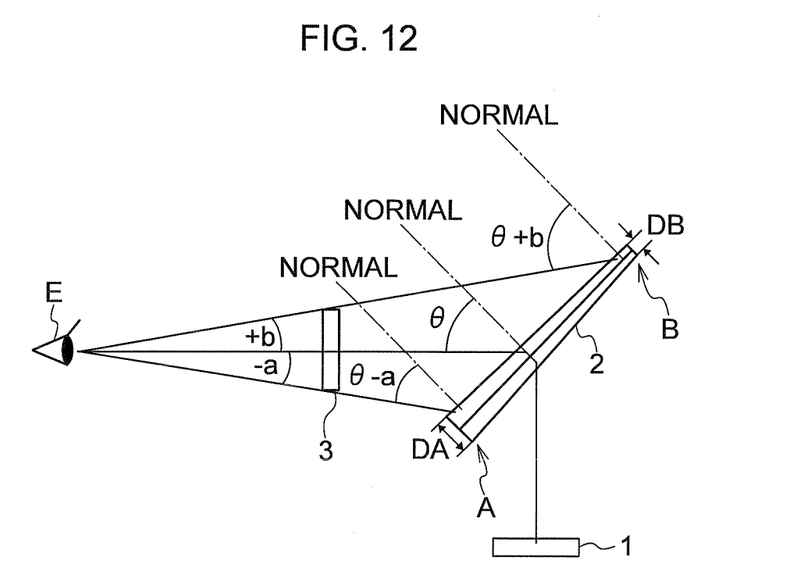
FIG. 12 is an optical system diagram illustrating a still further example of the present invention.

FIG. 12 illustrates the optical system of a floating image display device as a still further example of the present invention. The mirror 2 of the floating image display device illustrated in FIG. 12 has a wedge-shaped cross section. Specifically, the thickness D of the mirror 2 is gradually reduced from its lower end A to its upper end B. An incident angle of a viewer's line of sight onto the lower end A is small, and the lower end A has the largest thickness DA. An incident angle of a viewer's line of sight onto the upper end B is large, and the upper end B has the smallest thickness DB.

As illustrated in FIG. 12, when an incident angle of the center line of sight of the viewer onto the mirror 2 relative to the normal is represented as θ, an angle of sight of the viewer contains −a degrees downwardly relative to the center line of sight of the viewer, and +b degrees upwardly relative to the center line of sight of the viewer. This results in that the slope of the line of sight of the viewer incident onto the lower end A becomes an angle of θ−a degrees, and that the slope of the line of sight of the viewer incident onto the upper end B becomes an angle of θ+b degrees. These angles and the equation (1) allow the thickness D of the lower end A and the thickness D of the upper end B of the mirror 2 to be calculated as the thickness DA and thickness DB, respectively, in addition to the thickness D of a portion of the mirror 2; this portion corresponds to the center line of sight of the viewer.

Because the thickness D of the mirror 2 is continuously changed, for manufacturing the mirror 2 of the device illustrated in FIG. 12, one side of a lateral cross section of each rectangular parallelepiped member 20 is determined to obtain the thickness DA of the lower end A; this one side corresponds to the thickness direction of each rectangular parallelepiped member 20. Using the rectangular parallelepiped members 20 each with the dimensions produces the sheet portions 21 and 22 set forth above. Laminating the sheet portions 21 and 22 produces the mirror 2 with the constant thickness DA across the entire mirror 2.

Thereafter, either major side of the mirror 2 perpendicular to the thickness direction thereof is polished such that the thickness is gradually reduced toward the upper end B. This results in production of the mirror 2 illustrated in FIG. 12 whose: lower end A has the thickness DA, upper end B has the thickness DB, and lateral cross section has a wedge shape.

In addition, as another method of producing the mirror 2 illustrated in FIG. 12, the dimensions for each rectangular parallelepiped member 20 for producing the mirror 12 illustrated in FIG. 12 are calculated beforehand based on the change (distribution) of the thickness D, and each of the rectangular parallelepiped members 20 is formed according to the dimensions so that the mirror 12 is produced in the same manner as set forth above.

Figure 13:
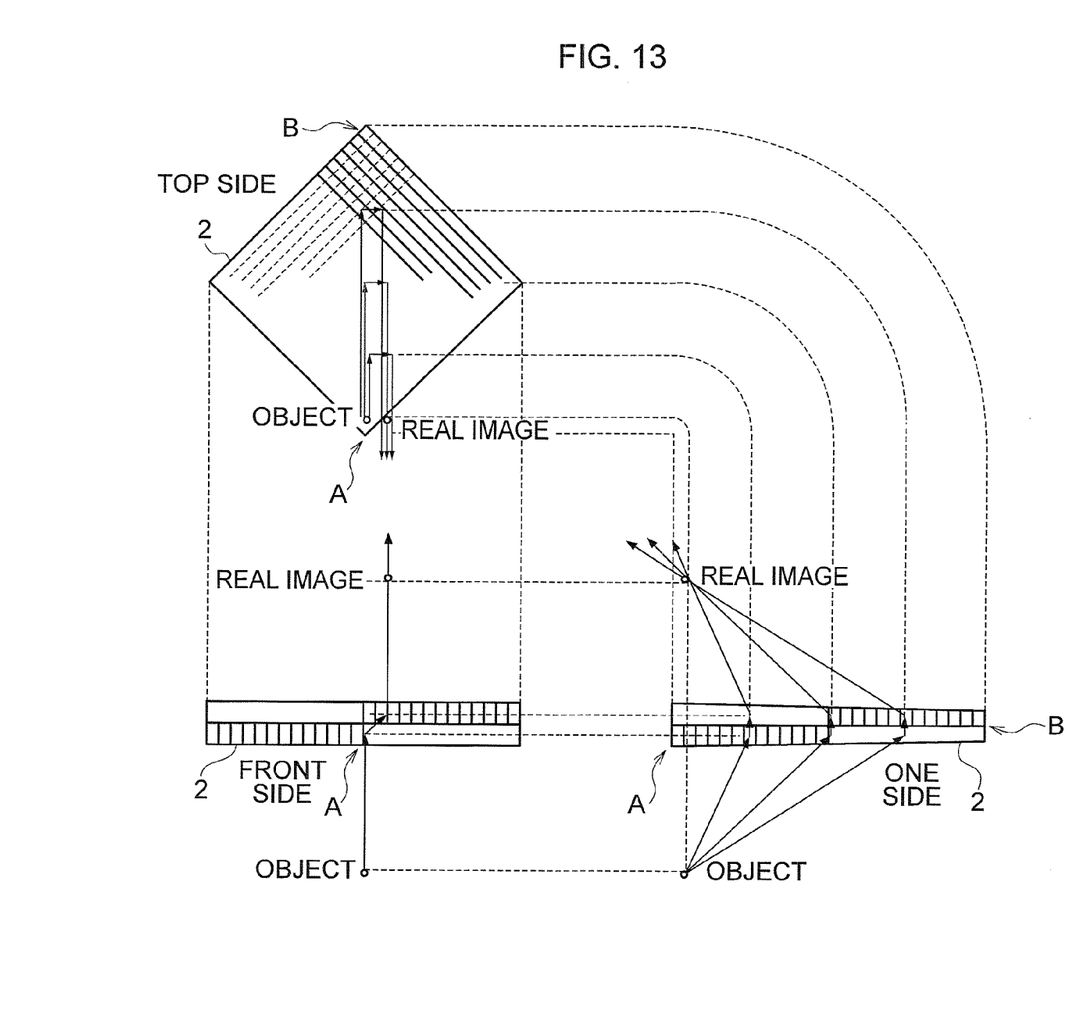
FIG. 13 is a view illustrating a state that light displayed by a device illustrated in FIG. 12 is divided into rays of light in front-back direction as being viewed from a view position of a viewer, and the rays of light are reflected by the mirror at two times so that the reflected rays of light produce a real image.
Figure 14:
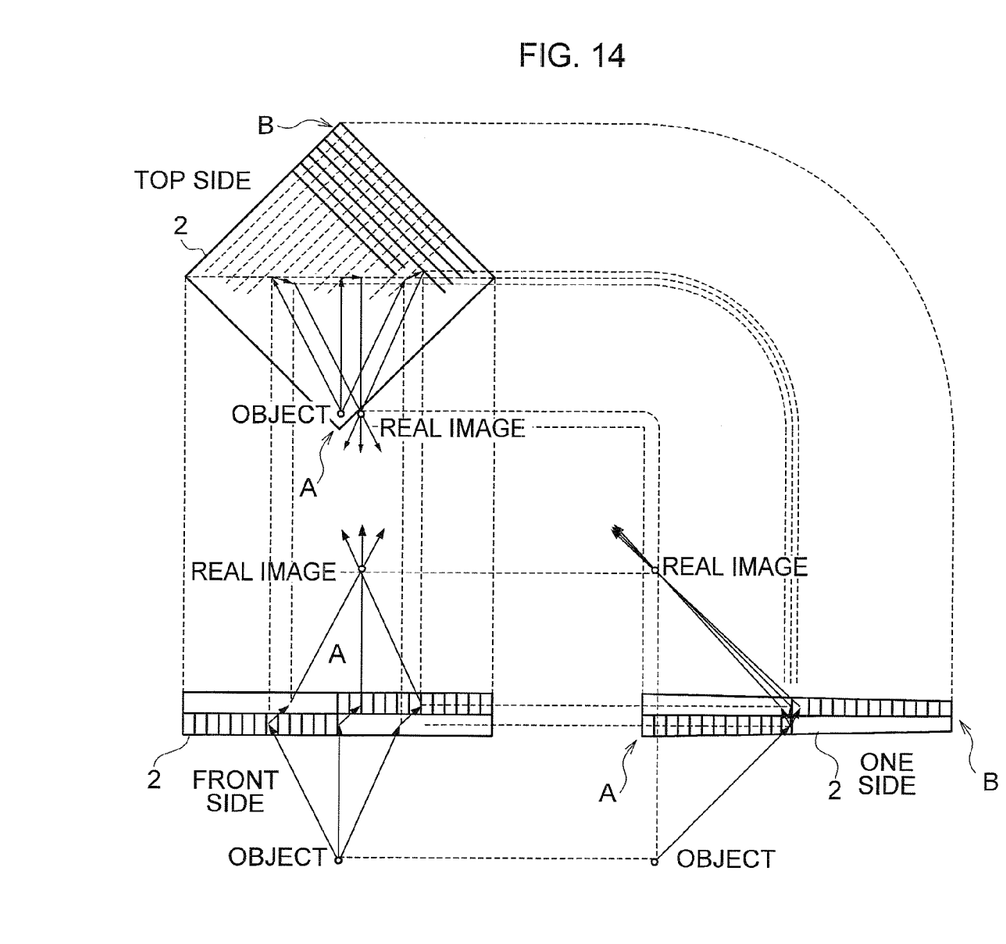
FIG. 14 is a view illustrating a state that the light displayed by the device illustrated in FIG. 12 is divided into rays of light in right and left directions as being viewed from the view position of the viewer, and the rays of light are reflected by the mirror at two times so that the reflected rays of light produce the real image.

FIG. 13 illustrates the state that light displayed by the object as the display section 1 is divided into rays of light in front-back direction (see arrows) as being viewed from the view position of the viewer, and the rays of light are reflected by the mirror 2 at two times so that the reflected rays of light produce a real image; this state is shown from the front side, one side, and the top side of the mirror 2 in FIG. 13. In addition, FIG. 14 illustrates the state that the light displayed by the object as the display section 1 is divided into rays of light in right and left directions as being viewed from the view position of the viewer, and the rays of light are reflected by the mirror 2 at two times so that the reflected rays of light produce the real image; this state is shown from the front side, one side, and top side of the mirror 2 in FIG. 14.

Light displayed by the display section 1 and left therefrom is reflected by the mirrors (light reflecting films 23) of the sheet portion 22 as the first layer of the mirror 2 so as to be guided to the mirrors (light reflecting films 23) of the sheet portion 21 as the second layer of the mirror 2; these mirrors of the second layer are arranged in the mirror 2 to be perpendicular to the mirrors of the first layer. Reflected light from the first layer is reflected again by the mirrors of the second layer so that the light reflected by the mirrors of the second layer forms a real image whose location is symmetrical to the object about the laminated sides of the first and second mirrors.

Thus, the viewer can view the floating image 3 with entirely uniform brightness and clear sharpness within the angle of sight thereof.

In each of the aforementioned embodiments, the display section 1 displays images, but an object, such as a photograph print or a doll can be used in place of the display section 1.

DESCRIPTION OF CHARACTERS

1, 4, 7 Display section
2 Mirror
5, 8 Half mirror
20 Rectangular parallelepiped member
21, 22 Sheet portion

The invention claimed is:

1. A floating image display comprising:
  an object; and
  a light reflecting optical member comprising:
    a first assembly comprising a plurality of first longitudinal members each having a planar first light reflecting side, the plurality of first longitudinal members being arranged oriented in a first direction; and
    a second assembly comprising a plurality of second longitudinal members each having a planar second light reflecting side, the plurality of second longitudinal members being arranged oriented in a second direction,
    the plurality of first longitudinal members and the plurality of second longitudinal members being laminated onto each other with the planar first light reflecting sides and the planar second reflecting sides intersecting with each other,
  wherein:
    the planar first light reflecting sides of the plurality of first longitudinal members and the planar second light reflecting sides of the plurality of second longitudinal members intersecting with each other constitute a plurality of micro mirror units arranged in matrix,
    the plurality of first longitudinal members and the plurality of second longitudinal members are arranged such that light left from the object is reflected by the planar first light reflecting sides only once, and thereafter, light reflected by the planar first light reflecting sides is reflected by the planar second light reflecting sides only once, light reflected by the planar second light reflecting sides being transferred to a viewer as a real floating image,
    the light reflecting optical member and the object are arranged such that a range of parts of the light left from the object, each of which has been reflected by the planar first light reflecting sides once, is nonoverlapped with a range of the real floating image to be viewed.

2. The floating image display device according to claim 1, wherein each of the plurality of first and second longitudinal members is a transparent rectangular parallelepiped member having four sides extending in a longitudinal direction thereof, one side of the four sides is the light reflecting side, and the plurality of transparent rectangular parallelepiped members of each of the first and second assemblies are respectively arranged such that the plurality of transparent rectangular parallelepiped members are disposed adjacent to each other with a first adjacent transparent rectangular parallelepiped member having a planar light reflecting side in contact with and opposite to another side of a second adjacent transparent rectangular parallelepiped member.

3. The floating image display device according to claim 2, wherein for each of the rectangular parallelepiped members, the side opposite to the light reflecting side constitutes a light absorbing side.

4. The floating image display device according to claim 2, wherein the first and second assemblies are arranged in contact with each other at respective third sides of the transparent rectangular parallelepiped member in the first and second assemblies.

5. The floating image display device according to claim 3, wherein the first and second assemblies are arranged in contact with each other at respective third sides of the transparent rectangular parallelepiped member in the first and second assemblies.

6. The floating image display device according to claim 1, wherein an opposite side of each of the planar first light reflecting sides of the plurality of first longitudinal members of the first assembly and the planar second light reflecting sides of the plurality of second longitudinal members of the second assembly constitutes a light absorbing side.

7. The floating image display device according to claim 1, wherein the light reflecting optical member has a first thickness at a first portion where a first incident angle of a line of sight of a viewer is a given value, and has a second thickness at a second portion where a second incident angle of a line of sight of the viewer is smaller than the first incident angle, the first thickness is thinner than the second thickness.

8. The floating image display device according to claim 7, wherein the thickness of the light reflecting optical member is continuously reduced from the first portion toward the second portion.

9. The floating image display device according to claim 1, wherein the object has a screen, and the object and the light reflecting optical member are arranged such that the screen of the object is nonoverlapped with a range of normal to the light reflecting optical member.

10. The floating image display device according to claim 1, wherein a surface of the light reflecting optical member is subjected to a process for reducing surface reflection of the surface thereof.

11. The floating image display device according to claim 1, wherein each of the planar first light reflecting sides of the plurality of first longitudinal members and planar second light reflecting sides of the plurality of second longitudinal members is formed with a light reflective material, and one of a plurality of resin layers and dielectric layers having significantly different indexes is used as the light reflective material of each of the planar first light reflecting sides of the plurality of first longitudinal members and planar second light reflecting sides of the plurality of second longitudinal members.

12. The floating image display device according to claim 1, wherein each of the planar first light reflecting sides of the plurality of first longitudinal members and planar second light reflecting sides of the plurality of second longitudinal members is formed with a light reflective material, and a metal corrosion protection layer is laminated on the light reflective material of each of the planar first light reflecting sides of the plurality of first longitudinal members and planar second light reflecting sides of the plurality of second longitudinal members.

13. The floating image display device according to claim 1, wherein each of the planar first light reflecting sides of the plurality of first longitudinal members and planar second light reflecting sides of the plurality of second longitudinal members is formed with a light reflective material, the light reflective optical member having at least one of a reduced-reflection evaporated coating, an anti-reflection sheet, and a reduced reflection film applied thereon.

14. The floating image display device according to claim 1, wherein the object is provided in a plurality, further comprising a half mirror, and wherein the half mirror is arranged between the plurality of objects and the light reflecting optical member, the rays of the light left from the plurality of objects are combined to be incident to the light reflecting optical member.

* * * * *